United States Patent
Usui

[19]

[11] Patent Number: 6,067,330

[45] Date of Patent: May 23, 2000

[54] DEMODULATION METHOD AND DEMODULATION APPARATUS

[75] Inventor: Takashi Usui, Tokyo, Japan

[73] Assignee: Sony Corporation, Tokyo, Japan

[21] Appl. No.: 09/286,754

[22] Filed: Apr. 6, 1999

[30] Foreign Application Priority Data

Apr. 10, 1998 [JP] Japan ................................ P10-099636

[51] Int. Cl.[7] .............................. H03D 1/00; H04L 27/06
[52] U.S. Cl. .......................................... 375/340; 714/701
[58] Field of Search .................................... 375/340, 316, 375/341, 342, 260; 714/701, 702, 788

[56] References Cited

U.S. PATENT DOCUMENTS

| | | | |
|---|---|---|---|
| 5,363,408 | 11/1994 | Paik et al. ................................ | 375/261 |
| 5,450,453 | 9/1995 | Frank ........................................ | 375/200 |
| 5,452,288 | 9/1995 | Rahuel et al. ............................ | 370/203 |
| 5,703,902 | 12/1997 | Ziv et al. . | |
| 5,896,419 | 4/1999 | Suzuki ...................................... | 375/219 |

*Primary Examiner*—Don Vo
*Assistant Examiner*—Phuong Phu
*Attorney, Agent, or Firm*—Jay H. Maioli

[57] ABSTRACT

A demodulation apparatus includes selectors (15r, 15i) for selecting designated data from data of N points outputted from a Fast Fourier-transform circuit (13) and previously-prepared 0 data and outputting the selected data as data of a plurality of series, output order data generators (16, 17) for designating data selected by the selectors and a decoder (20) for decoding data based on data of a plurality of series outputted from the selectors. An interleaved and punctured OFDM-modulated signal can be demodulated by a simple arrangement and in a short period of time.

10 Claims, 13 Drawing Sheets

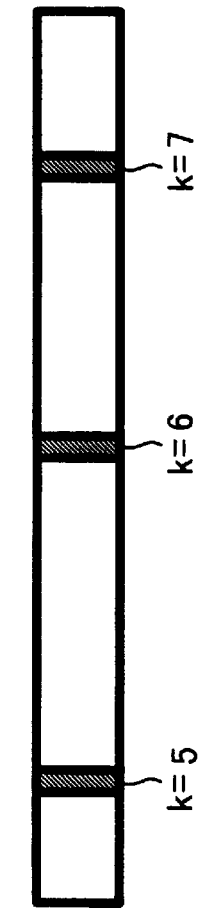
FIG. 6A (RELATED ART) Not Interleaved
FIG. 6B (RELATED ART) Interleaved
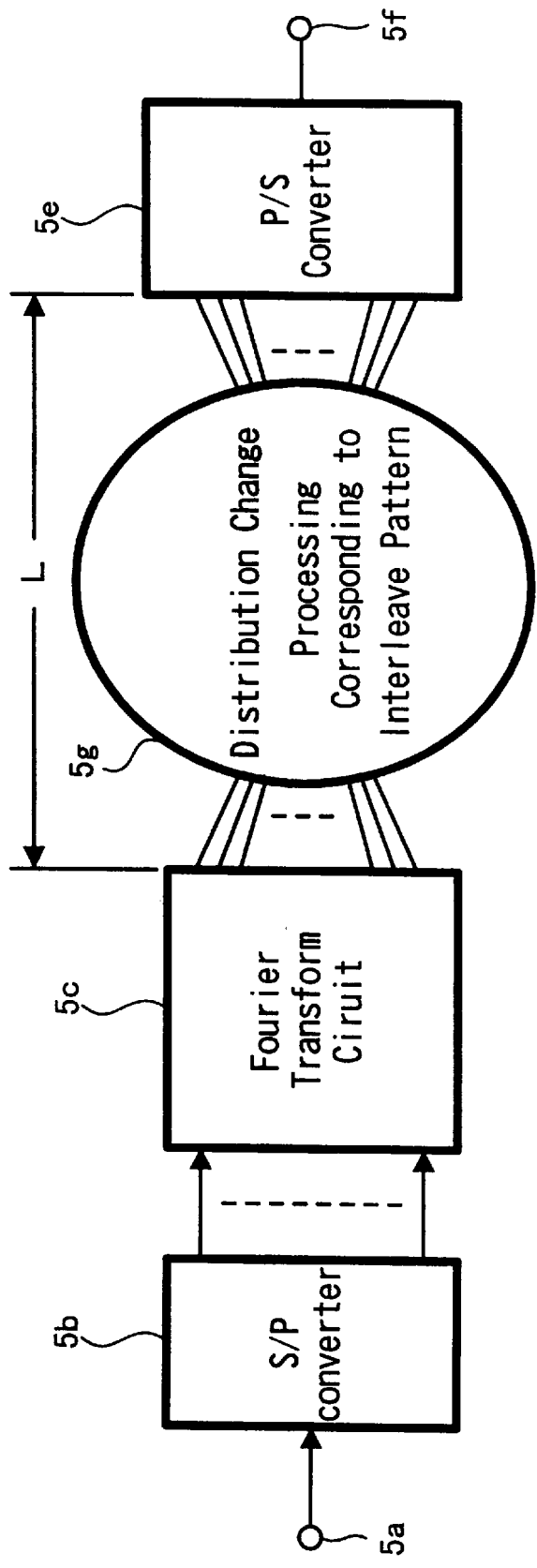
FIG. 7 (RELATED ART)

FIG. 11A (RELATED ART) Input ai
FIG. 11B (RELATED ART) Output G1
FIG. 11C (RELATED ART) Output G2
FIG. 11D (RELATED ART) Input bi

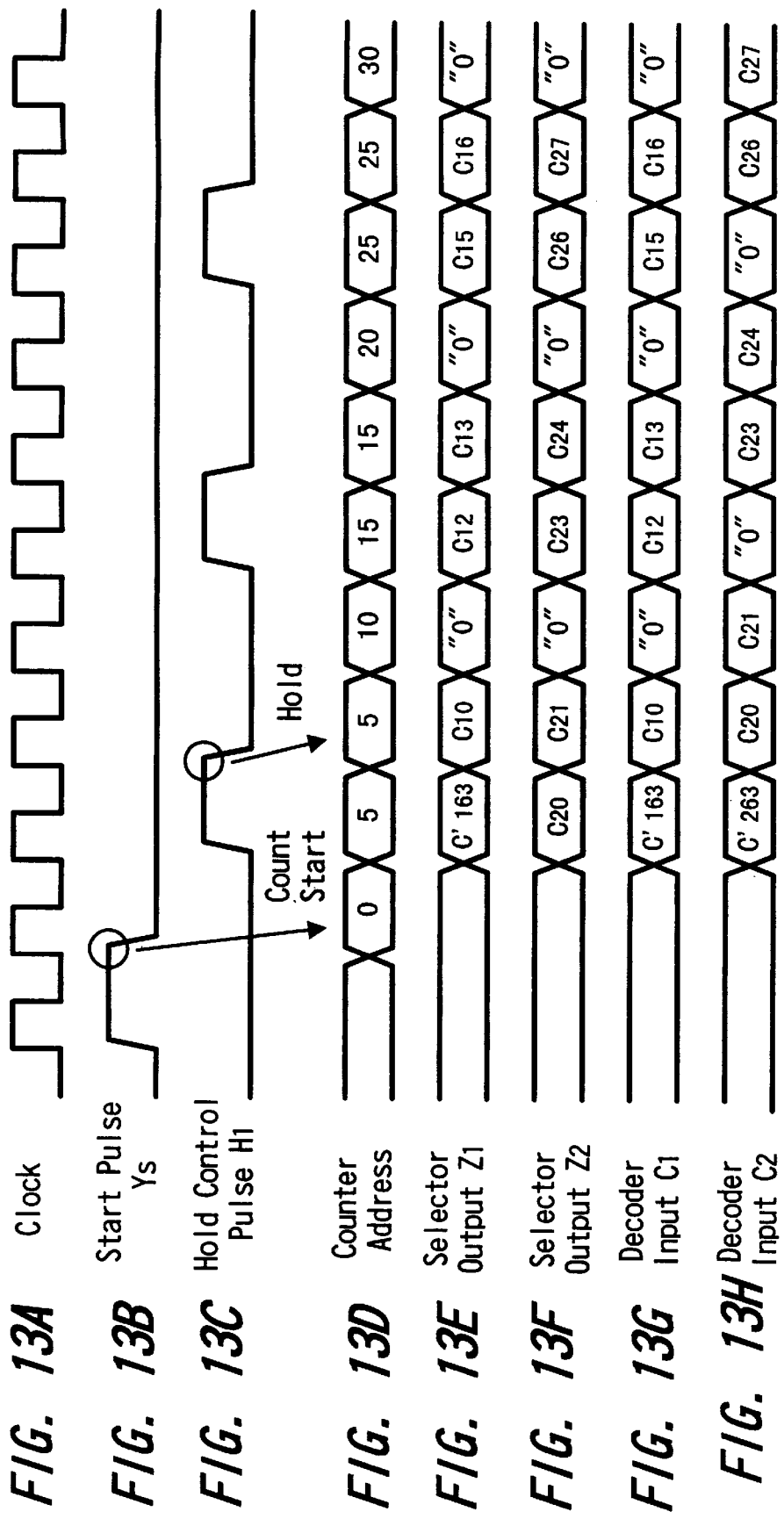

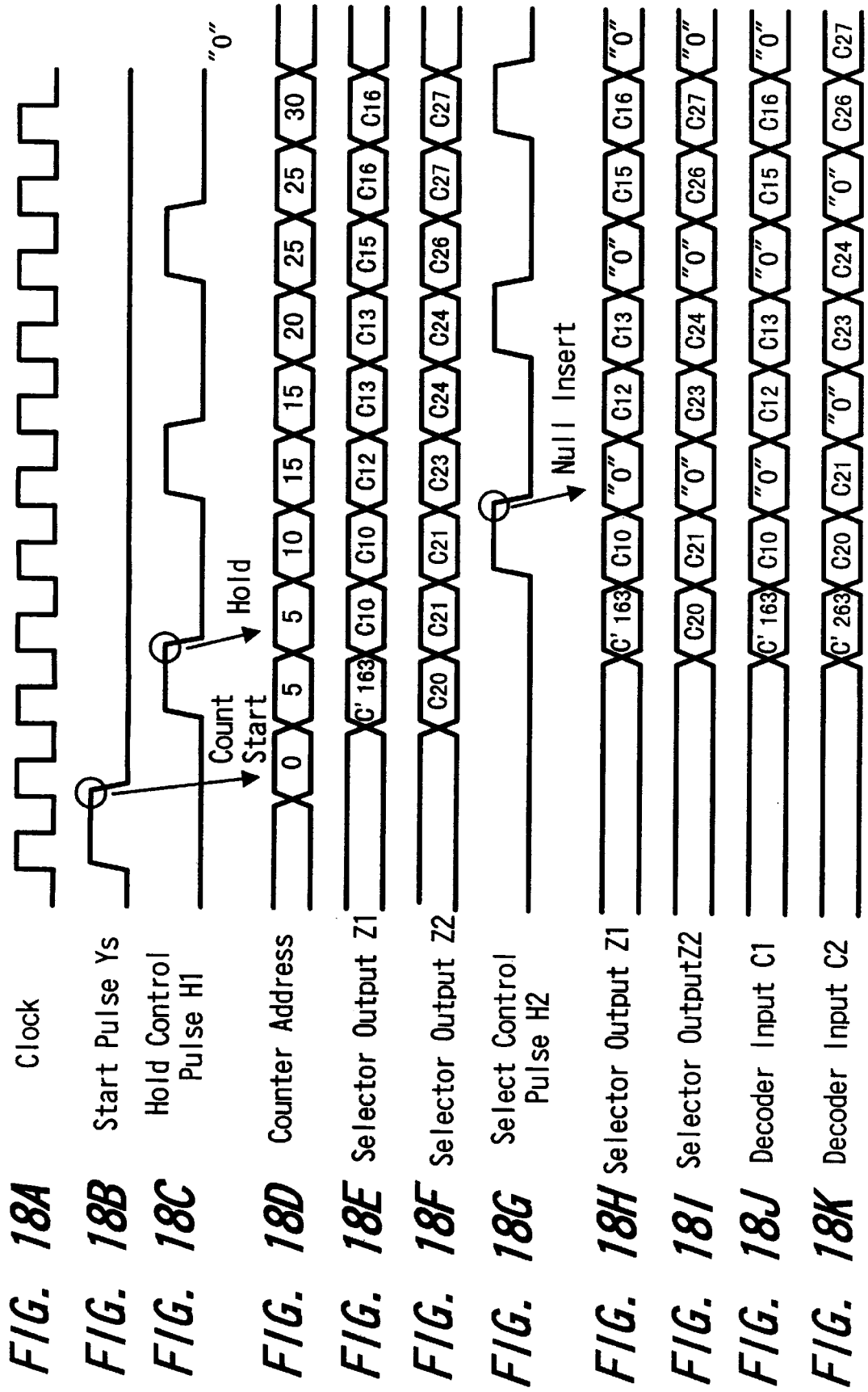

DEMODULATION METHOD AND
DEMODULATION APPARATUS

BACKGROUND OF THE INVENTION

1. Field of the Invention

The present invention relates to a method of demodulating an orthogonal frequency division multiplexing (hereinafter simply referred to as an OFDM)-modulated signal and a demodulation apparatus to which this demodulation method is applied, and particularly to a technology for use in demodulating an interleaved OFDM-modulated signal for depuncture processing.

2. Description of the Related Art

Heretofore, as one of various modulation systems for transmitting digital data of a relatively large capacity via radio waves, the OFDM-modulation is now commercially available.

FIG. 1 of the accompanying drawings is a block diagram showing an example of such a radio transmission. As shown in FIG. 1, for example, there is provided a video signal source 1 comprising a tuner for receiving a television broadcasting in a relatively small area such as home and office and a reproducing apparatus for playing back a video program recorded on a recording medium. A video signal (digital video data) outputted from a video signal source 1 is supplied to a radio transmission apparatus 2. The radio transmission apparatus 2 OFDM-modulates the video signal thus supplied to provide an OFDM-modulated signal, and this OFDM-modulated signal is supplied to an antenna 3, from which the OFDM-modulated signal is transmitted at a predetermined frequency band via radio waves. Then, the signal thus transmitted via radio waves is received by a radio reception apparatus 5 connected to an antenna 4. The radio reception apparatus 5 demodulates the OFMD waves of the received frequency band to provide a video signal. Then, the received video signal is supplied to a video recording/reproducing apparatus 6 and thereby recorded on a predetermined recording medium. Alternatively, the received video signal is supplied to a receiver 7 and thereby received and reproduced on a display of the receiver 7. In this case, the video signal recorded by the video recording/reproducing apparatus 6 may be reproduced and the reproduced signal may be supplied to the receiver 7, thereby being received and reproduced on the display of the receiver 7.

According to the above-mentioned arrangement, the OFDM-modulated signal is transmitted between the antenna 3 connected to the radio transmission apparatus 2 and the antenna 4 connected to the radio reception apparatus 5 via radio waves, whereby digital data of a large capacity can be efficiently transmitted via radio waves.

FIG. 2 is a block diagram showing an example of an arrangement for OFDM-modulating digital data so that such digital data may be efficiently transmitted from the radio transmission apparatus 2. As shown in FIG. 2, a transmission signal (digital data) supplied to an input terminal 2a is supplied to a serial-to-parallel (S/P) converter 2b, in which it is converted into parallel data at every predetermined unit. The parallel data thus converted by the S/P converter 2b is supplied to an interleave memory 2c, in which it is interleaved for changing data arrangement by changing the orders in which data is written in or read out from the interleave memory 2c. Then, the parallel data thus interleaved is supplied to an inverse fast Fourier transform circuit (simply referred to as an IFFT circuit) 2d, in which it is processed by the IFFT computation so that the orthogonal transform processing is effected to transform a time axis into a frequency axis. Then, the parallel data thus orthogonal-transformed is supplied to a parallel-to-serial (hereinafter simply referred to as a P/S) converter 2e, in which it is converted into serial data. The resultant serial data is supplied to an output terminal 2f. The data supplied to the output terminal 2f is supplied to a transmission processing system, not shown, in which it is frequency-converted into data of a predetermined transmission frequency band and transmitted via radio waves.

FIG. 3 is a block diagram showing an example of an arrangement for receiving and demodulating the OFDM-modulated signal received via radio waves by the radio reception apparatus 5. As shown in FIG. 3, a signal of a predetermined frequency band received at an antenna (not shown) and frequency-converted into an intermediate-frequency signal is supplied to an input terminal 5a. The data thus supplied to the input terminal 5a is supplied to a S/P converter 5b, in which it is converted into parallel data at every predetermined unit. The converted data is supplied to a fast Fourier transform circuit (hereinafter simply referred to as an FFT circuit) 5c, in which it is processed by the FFT computation so that the orthogonal transform processing is effected to transform a frequency axis into a time axis. The data thus orthogonal-transformed is supplied to a deinterleave memory 5d, in which it is deinterleaved for recovering the original data arrangement by changing the order in which data is written in or read out from the deinterleave memory 5d. The parallel data thus deinterleaved is supplied to a P/S converter 5e, in which it is converted into serial data. The resultant serial data is supplied to an output terminal 5f.

The circuit arrangement of FIG. 3 demodulates the OFDM-modulated signal at a timing shown in FIG. 4. Specifically, as shown in FIG. 4, this timing comprises an input period Ta in which data is inputted to the FFT circuit 5c, an FFT processing period Tb in which data is FFT-processed by the FFT circuit 5c, an output period Tc in which the data thus FFT-processed is outputted and a memory read period Td in which the data outputted during the output period Tc is written in the deinterleave memory 5d at the same time it is outputted and then the written data is read out from the deinterleave memory 5d.

The manner in which digital video data is interleaved and transmitted in the transmission processing shown in FIGS. 2 and 3 will be described with reference to FIGS. 5A, 5B and FIGS. 6A, 6B. As shown in FIG. 5A, for example, when digital video data is OFDM-modulated such that data of 50 units from data k=0 to k=49 are dispersed into subcarriers $x_0$ to $x_{49}$ and transmitted, if this signal is correctly received at the reception side, then there arises no problem. In this case, let it be assumed that subcarriers of data of data k=5, k=6, k=7 cannot be received correctly due to some defects such as a multipath fading as shown in FIG. 5B and data k=5, k=6, k=7 are lost.

At that time, when digital video data is not interleaved and then transmitted, as shown in FIG. 6A, data k=5, k=6, k=7 of consecutive three units within one slot are lost so that the burst error occurs. It is difficult to completely recover such burst error by an error-correction code or the like. When on the other hand digital video data is interleaved and then transmitted, as shown in FIG. 6B, for example, data k=5, k=6, k=7 of three units are dispersed and disposed within one slot (dispersed state becomes different depending upon the interleaved state) so that random errors occur. Therefore, respective random errors can be completely recovered by the error-correction code or the like.

In this manner, digital video data is interleaved and transmitted, whereby data can be suppressed from being lost on the reception side at minimum and a satisfactory transmission state can be maintained.

While the deinterleaving is executed by using the deinterleave memory 5d in the arrangement shown in FIG. 3, there is known an arrangement in which a deinterleaving is executed without using a memory. FIG. 7 is a block diagram showing an example of such a case in which the deinterleaving is executed without using a memory. A circuit arrangement shown in FIG. 7 is the same as that of FIG. 3 until the data supplied to the input terminal 5a is supplied to the S/P converter 5b, in which it is converted into the parallel data at every predetermined unit and the converted output is supplied to the FFT circuit 5c, in which it is processed by the FFT computation so that the orthogonal transform processing is effected to transform the frequency axis into the time axis. Then, the orthogonal-transformed parallel data is rearranged by a distribution change processing 5g corresponding to the interleave pattern. The parallel data thus rearranged is supplied to the P/S converter 5e, in which it is converted into serial data. The resultant serial data is supplied to the output terminal 5f.

The arrangement shown in FIG. 7 demodulates the OFDM-modulated signal at a timing shown in FIG. 8. Specifically, as shown in FIG. 8, this timing comprises an input period Te in which data is inputted to the FFT circuit 5c, an FFT processing period Tf in which data is FFT-processed by the FFT circuit 5c and an output period Tg in which the data thus FFT-processed is outputted. According to the above-mentioned arrangement shown in FIG. 7, at the same time, the data is outputted from the FFT circuit 5c and supplied to the P/S converter 5e, the data is deinterleaved by the distribution change processing.

On the other hand, there is known a decimation processing called a puncture processing that is executed when a convolutional-coded signal is modulated as the OFMD-modulated signal. FIG. 9 is a block diagram showing an example of a conventional circuit arrangement for effecting the puncture processing. As shown in FIG. 9, transmission data $a_1$ supplied to an input terminal 8a is convolutional-coded by a convolutional encoder 8b and thereby generated as data $G_1$, $G_2$ of two series. The resultant data $G_1$, $G_2$ of two series are supplied to and decimated by a decimation processing circuit 8c and thereby generated as puncture-processed encoded data $b_i$. Here, when a coding rate at the convolutional encoder 8b is r=½, for example, a coding rate of the puncture-processed encoded data $b_i$ is r=¾.

FIG. 10 is a block diagram showing an example of a convolutional encoder having a coding rate r=/2. As shown in FIG. 10, transmission data $a_1$ supplied to an input terminal 9a is supplied to a shift register 9b. This shift register 9b is of such a three-stage shift register that data stored in the first stage and data stored in the third stage are supplied to and added by an adder 9c and thereby generated as data $G_1$. Also, data stored in the first stage of the shift register 9b and data stored in the second stage are supplied to and added by an adder 9d and thereby generated as data $G_2$.

FIGS. 11A to 11D are timing charts showing the manner in which the data $G_1$, $G_2$ of two series thus convolutional-coded are decimated. When data series $a_0$, $a_1$, $a_2$ . . . , shown in FIG. 11A is inputted data $a_i$, the convolutional-coded two series data $G_1$, $G_2$ become data $g_{10}$, $g_{11}$, $g_{12}$ and data $g_{20}$, $g_{21}$, $g_{22}$ . . . as shown in FIGS. 11B and 11C. Here, the decimation processing circuit 8c outputs data $g_{10}$, $g_{20}$, $g_{21}$, $g_{12}$ by using the data $g_{10}$, $g_{11}$, $g_{12}$, $g_{20}$, $g_{21}$, $g_{22}$, in that order, as shown in FIG. 11D. That is, the data $g_{11}$, $g_{22}$ are decimated as shown by crosses in FIGS. 11B, 11C. As a result, the data $b_i$ thus decimated becomes data convolutional-coded at the coding rate r=¾.

Incidentally, when the data thus punctured is received and demodulated, there should be executed a depuncture processing for restoring the data thus decimated.

When the OFMD-modulated signal is demodulated, if the data is deinterleaved by using the deinterleave memory 5d as shown in FIG. 3, there is then the problem that the demodulation processing arrangement unavoidably is made complicated by the required deinterleave memory 5d. Also, with respect to the time required by the demodulation processing, a processing time $T_1$ shown in FIG. 4 needs a demodulation processing time longer than the demodulation processing time required when data, which is not interleaved, is processed by the time necessary for reading out data from the deinterleave memory 5d. There is then the problem that it takes plenty of time for the demodulation processing.

As shown in FIG. 7, in the distribution change processing for the parallel data outputted from the FFT circuit, if the data is deinterleaved, then a processing time $T_2$ shown in FIG. 8 is the same as the time required when data, which is not interleaved, is processed, and the processing time can be avoided from being extended. However, since the P/S converter 5e should be yet connected to the output section, there is then the problem that a circuit board in which the OFDM-modulated signal demodulation circuit is assembled becomes unavoidably large in size.

Also, when data is modulated, if data is punctured by using the convolutional encoder shown in FIG. 9, then upon demodulation, the depuncture processing for recovering decimated data is required. There is then the problem that the depuncture processing arrangement and the depuncture processing are complicated. That is, as shown in FIGS. 11A to 11D, a clock rate of data (FIG. 11A) which is not yet decimated and a clock rate of decimated data (FIG. 11D) are placed in a relationship of an integral multiple so that a clock of ¾ of data clock fj, for example, is required for the processing. There is then the problem that such a clock generation processing becomes complicated. Further, since a processing for re-timing decimated data becomes necessary, it is unavoidable that a circuit scale becomes large in size and a power consumption becomes large. Furthermore, since clocks having different frequencies are used, a spurious radiation occurs to exert a bad influence upon high-frequency system circuit blocks for transmitting and receiving a signal via radio waves. As such bad influence, there are known a deterioration of a reception performance and an occurrence of radiation disturbance of out-of-band spurious radio waves.

SUMMARY OF THE INVENTION

In view of the aforesaid aspect of the present invention, it is an object of the present invention to provide a demodulation method and a demodulation apparatus in which an interleaved and punctured OFDM-modulated signal can be demodulated by a simple arrangement in a short period of time.

According to an aspect of the present invention, there is provided a demodulation method which is comprised of the steps of transforming data distributed on a frequency axis at a predetermined frequency interval into data of N points (N is an arbitrary integer) at every predetermined unit, selecting data designated based on predetermined output order data from the transformed data of N points and previously-prepared 0 data and effecting a decoding processing based on data of a plurality of series.

According to another aspect of the present invention, there is provided a demodulation apparatus which is comprised of Fourier-transform means for transforming data distributed on a frequency axis at a predetermined frequency interval into data of N points (N is an arbitrary integer) at every predetermined unit, means for selecting designated data from the transformed data of N points outputted from the Fourier-transform means and previously-prepared 0 data and outputting the selected data as data of a plurality of series, output order data generating means for designating data selected by the selecting means and decoding data based on data of a plurality of series outputted from the selecting means.

BRIEF DESCRIPTION OF THE DRAWINGS

FIGS. 6A and 6B are diagrams used to explain the manner in which burst errors are generated when the OFDM-modulated wave is interleaved or not interleaved;

FIG. 7 is a block diagram showing another example of an arrangement for demodulating the interleaved OFDM-modulated wave;

FIGS. 13A to 13H are timing charts showing the processing state according to the first embodiment of the present invention;

FIGS. 18A to 18K are timing charts showing an example of a processing executed by the demodulation apparatus according to the fourth embodiment of the present invention.

DESCRIPTION OF THE PREFERRED EMBODIMENTS

A first embodiment according to the present invention will hereinafter be described with reference to FIG. 12, FIGS. 13A to 13H and FIGS. 14A and 14B.

Figure 1:
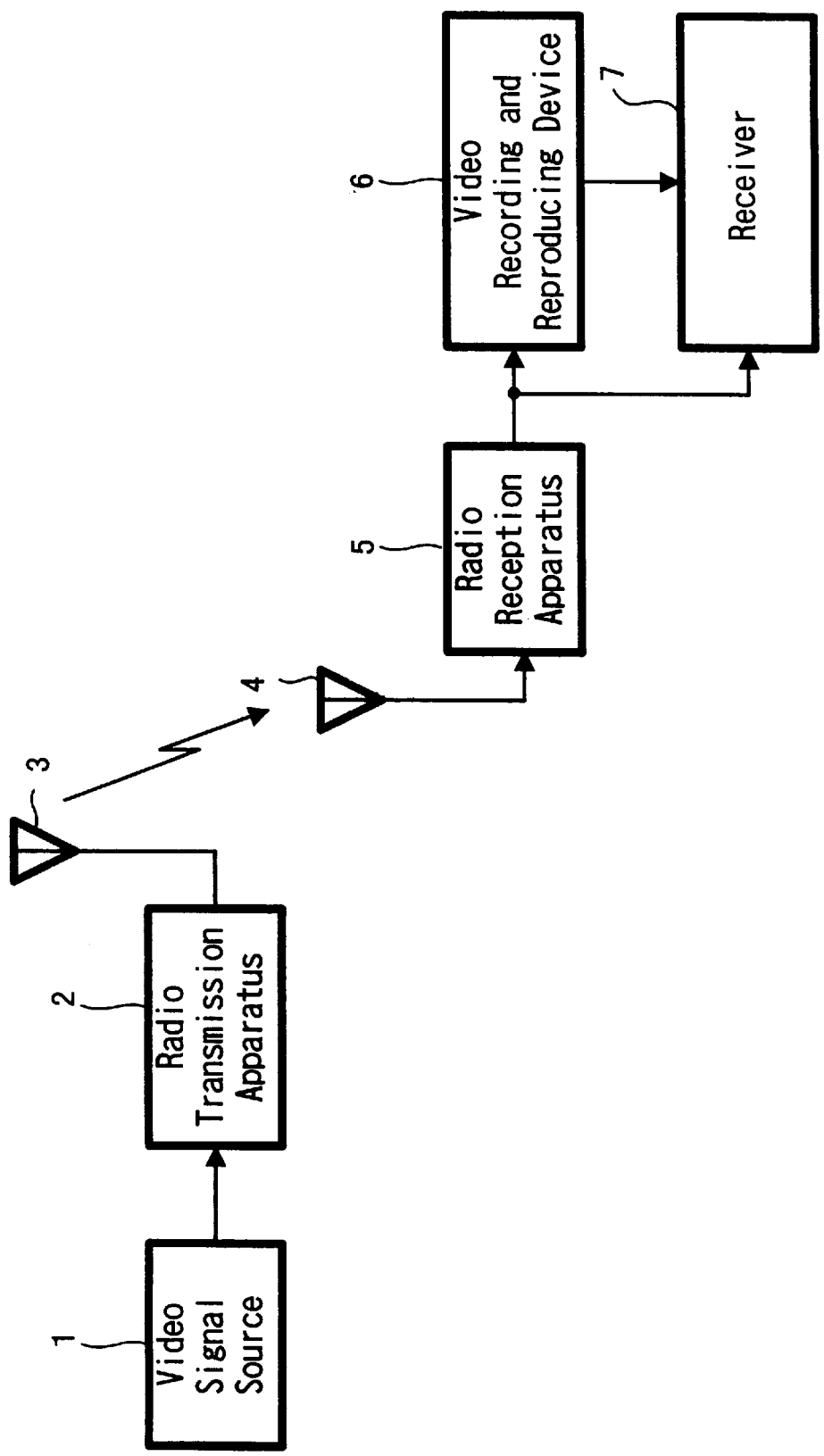
FIG. 1 is a block diagram showing an example of a radio transmission system using OFDM-modulation system.
Figure 2:
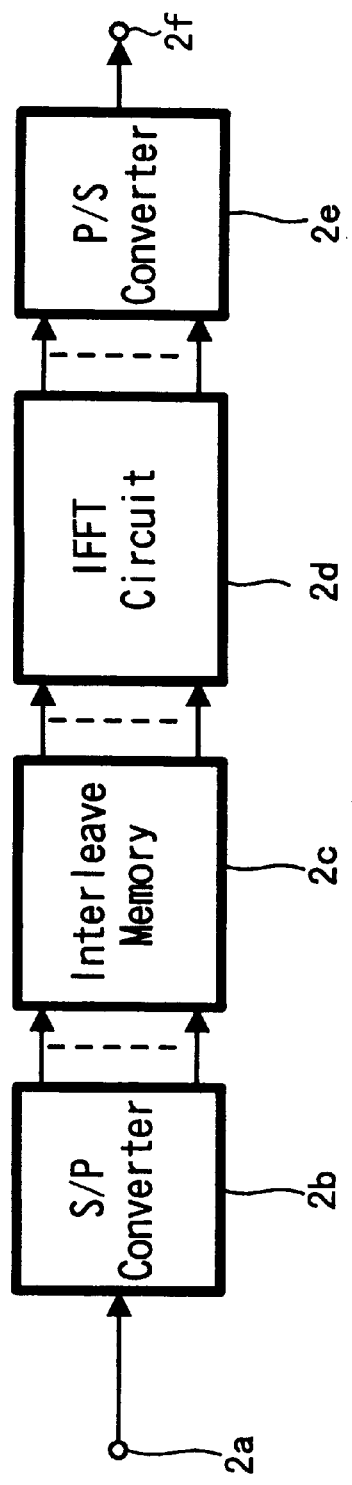
FIG. 2 is a block diagram showing an example of an arrangement for generating an interleaved OFDM-modulated wave.
Figure 3:
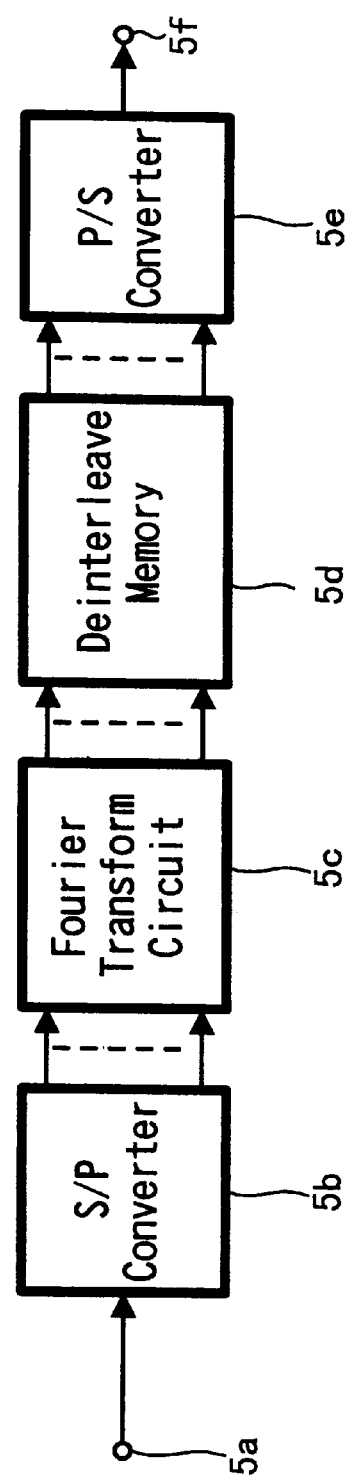
FIG. 3 is a block diagram showing an example of a conventional arrangement for demodulating the interleaved OFDM-modulated wave.
Figure 4:
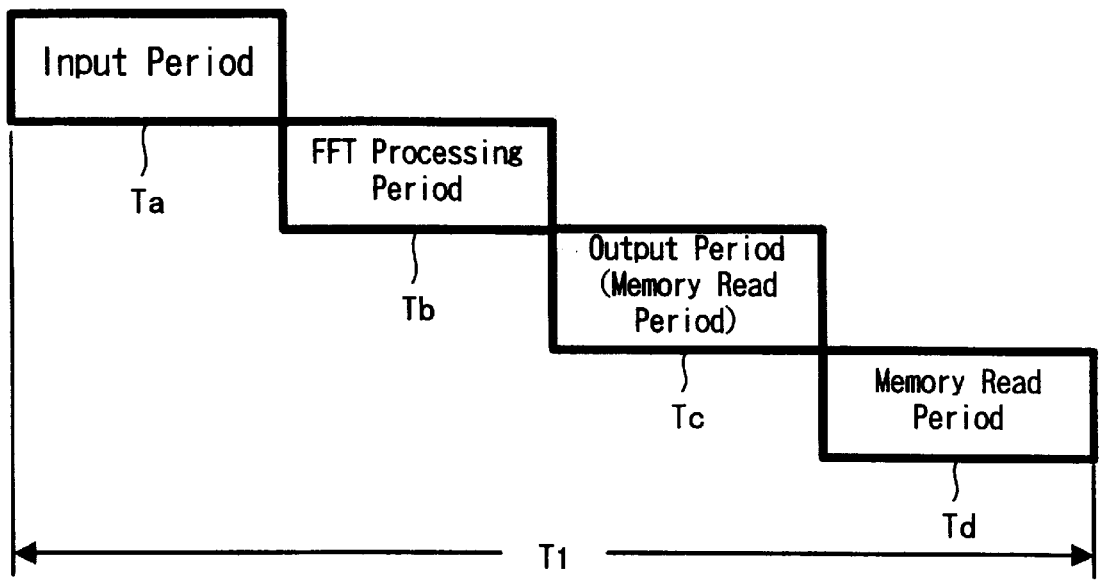
FIG. 4 is a timing chart showing the demodulation processing state of the example shown in FIG. 3.
Figure 5A:
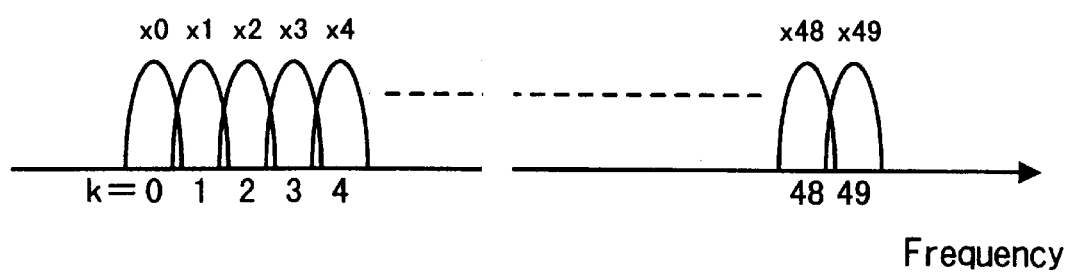
FIGS. 5A and 5B are waveform diagrams used to explain an example of the manner in which burst errors are generated in the OFDM-modulated wave.
Figure 5B:
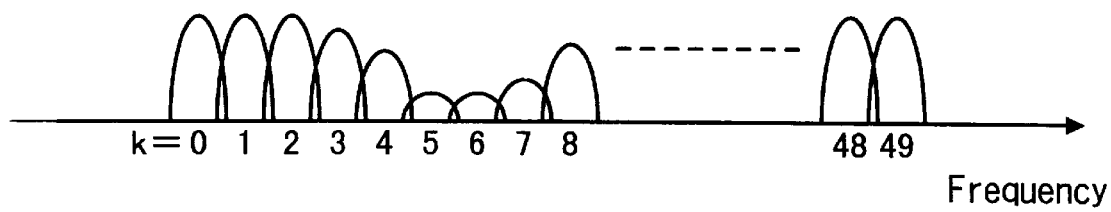
Figure 8:
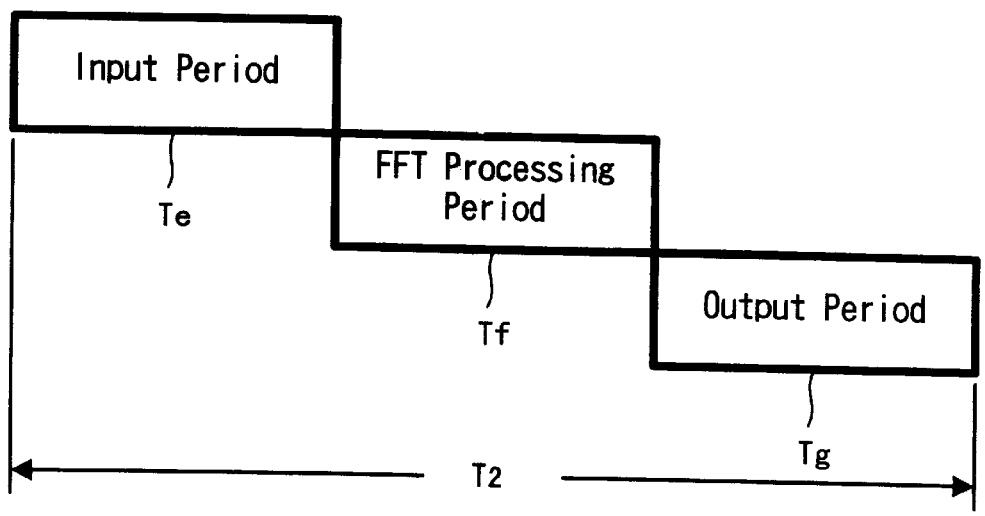
FIG. 8 is a timing chart showing the demodulation processing state of the example shown in FIG. 7.
Figure 9:
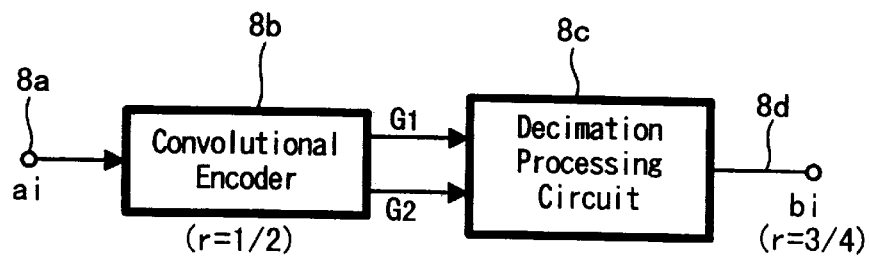
FIG. 9 is a block diagram showing an example of a puncture processing.
Figure 10:
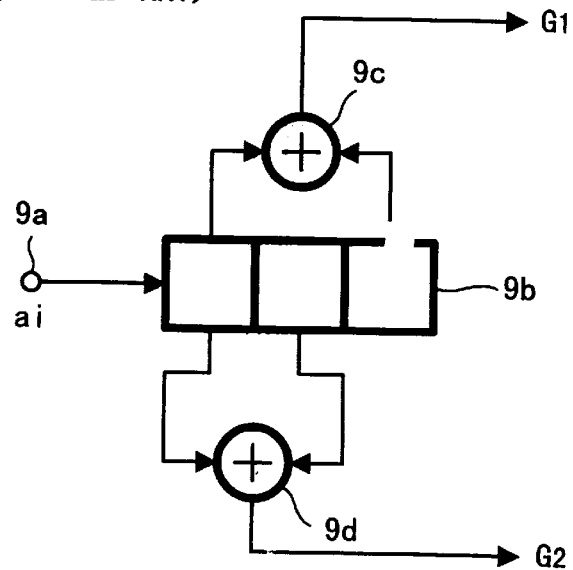
FIG. 10 is a block diagram showing an example of a convolutional encoder.
Figure 11:
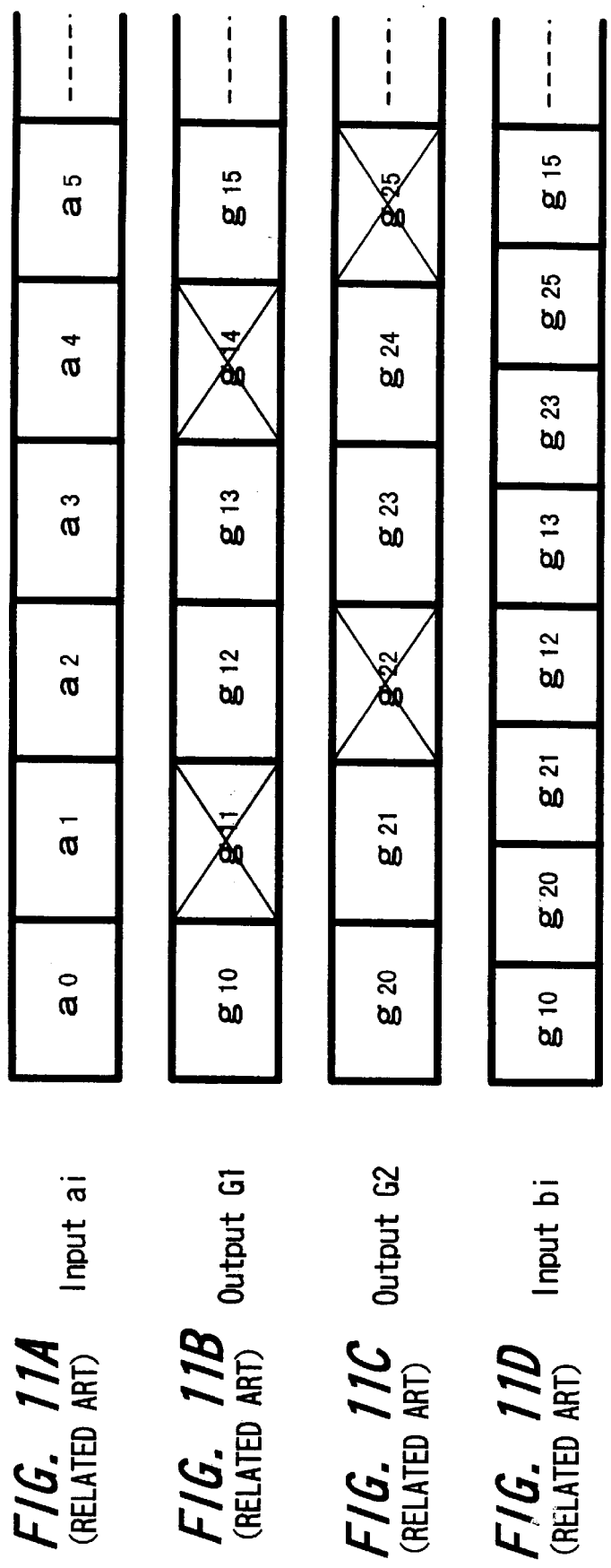
FIGS. 11A to 11D are timing charts showing an example of a puncture processing state.
Figure 12:
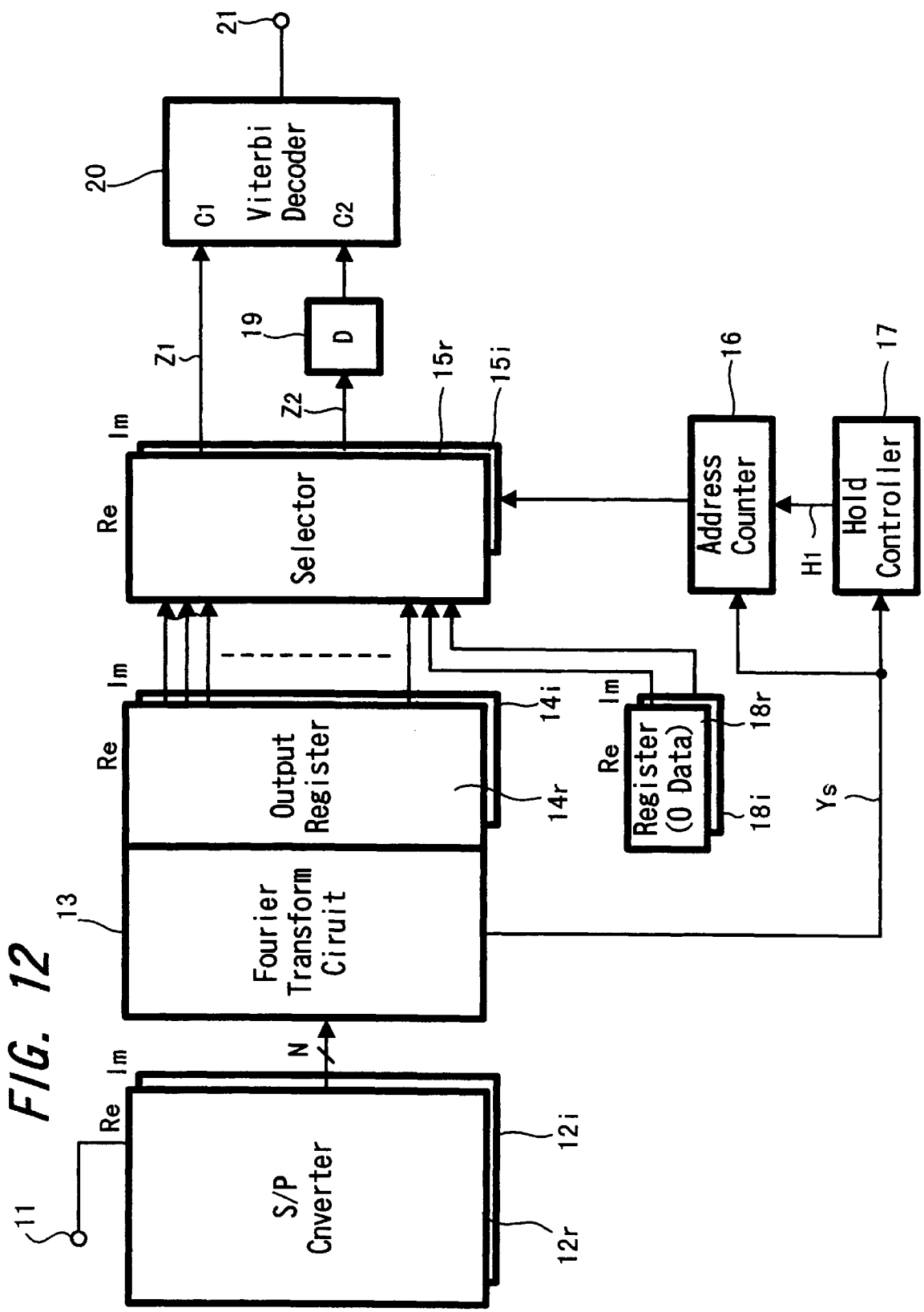
FIG. 12 is a block diagram showing a demodulation apparatus according to a first embodiment of the present invention.

In this embodiment, the present invention is applied to a demodulation section within a reception apparatus which receives an OFDM-modulated signal transmitted via radio waves. FIG. 12 is a block diagram showing an arrangement of a demodulation section according to this embodiment. As shown in FIG. 12, an OFDM-modulated signal, which was converted into an intermediate-frequency signal (or baseband signal) upon reception, is supplied to an input terminal 11. The OFDM-modulated signal supplied to the input terminal 11 is supplied to S/P converters 12$r$, 12$ii$, in which it is converted into N-bit (64 bits) parallel data. Here, the OFDM-modulated signal supplied to the input terminal 11 is a complex signal comprising a real part and an imaginary part. Data of the real part is processed by the S/P converter 12$r$, and data of the imaginary part is processed by the S/P converter 12$i$. In the following description, reference numerals with r attached thereto designate circuits which process data of the real part, and reference numerals with i attached thereto designate circuits which process data of the imaginary part.

The 64-bit parallel data outputted from the S/P converters 12$r$, 12$i$ is supplied to a fast Fourier transform circuit 13, in which an orthogonal transform processing is effected to transform a frequency axis into a time axis by a fast Fourier transform computation to thereby generate N points M-bit data. A real part and an imaginary part of the output section of the fast Fourier transform circuit 13 set one point of M-bit data in N output registers 14$r$, 14$i$. An example of N points M-bit data will be described. When inputted parallel data, for example, is 64 bits, one point is generated from 12 bits, and there are generated 64 points of 12-bit data. That is, when 64-bit data supplied to the fast Fourier transform circuit 13 is assumed to be $\{X_k\}$, k=0 to 63, and the data $\{X_k\}$ is transformed into 64 points of 12-bit data $\{Y_n\}$ (n=0 to 63). In the following description, let us assume that there are generated 64 points of one point of 12-bit data.

12-bit data of 64 points outputted from output register 14$r$, 14$i$ of the fast Fourier transform circuit 13 are supplied to selectors 15$r$, 15$i$ simultaneously. The selectors 15$r$, 15$i$ sequentially select output points based on data for designating points outputted by a counter 16 serving as an output order data generating means. In this embodiment, previously-prepared 0 data (here, data in which 12 bits, for example, are all 0) is supplied to 0-data registers 18$r$, 18$i$ in addition to the outputs from the output registers 14$r$, 14$i$. The selectors 15$r$, 15$i$ select the output point of the output registers 14$r$, 14$i$ in a predetermined order based on the output from the counter 16, and select 0 data supplied from the registers 18$r$, 18$i$ instead of the output data from the registers 14$r$, 14$i$ at predetermined positions. The order in which the output point is selected based on the count address of the counter 16 is the order corresponding to the interleave pattern effected on the received OFDM-modulated signal. Also, the position t which 0 data is selected based on the count address of the counter 16 is the position at which data is decimated by the puncture processing effected on the received OFDM-modulated signal.

Data $Z_1$ selected by the selector 15$r$ is supplied to a $C_1$ input of a Viterbi decoder 20, and data $Z_2$ selected by the selector 15$i$ is delayed by one clock period by a delay circuit 19 and supplied to a $C_2$ input of a Viterbi decoder 20. Then, the Viterbi decoder 20 effects the Viterbi decoding processing on the signal based on the inputted data $C_1$ and $C_2$ of the two systems, and data thus Viterbi-decoded is supplied to an output terminal 21.

Also, the count output of the address counter 16 is started by a start pulse Ys outputted from the fast Fourier transform circuit 13, and its counting state is controlled under control of a hold controller 17. A processing timing of the hold controller 17 is also set by the start pulse Ys outputted from the fast Fourier transform circuit 13. The state in which the counter 16 is operated under control of the hold controller 17 is such one that a continuous count operation of two clock periods, for example, and the hold processing of count value of one clock periods are repeatedly carried out.

Data counted by the address counter 16 will be described below. There is used a counter which generates data ranging from 0 to 63 by 6 bits, and the count processing is executed as in the order of 0, 5, 10, 15 . . . Incidentally, when the address counter 16 supplies the same address data to the selectors 15r, 15i during two clock period, the selectors 15r, 15i select 0 data.

FIGS. 13A to 13H are timing charts showing the demodulation processing state obtained in the circuit according to this embodiment. The processing state thereof will be described below. A clock signal (FIG. 13A) synchronized with the input terminal 11 is supplied to each circuit, and each circuit executes the processing in synchronism with this clock signal. Initially, when a transformed output of one unit is outputted from the fast Fourier transform circuit 13, there is outputted a start pulse Ys shown in FIG. 13B. Then, the count address of the counter 16 is reset based on this start pulse Ys, and a hold control pulse $H_1$ (shown in FIG. 13C) of the hold controller 17 is reset.

Here, the hold control pulse $H_1$ causes the counter 16 to hold the count once per three cycles of the clock signal. In the address counted by the counter 16, the same address values are repeated once per three cycles as shown in FIG. 13D. This address order corresponds to the order of the deinterleave processing.

On the address data thus generated, the data $Z_1$ selected by the selector 15r and the data $Z_2$ selected by the selector 15i are outputted as shown in FIGS. 13E and 13F. Data selected during the next clock cycle of the cycle in which the same address values are repeated becomes "0" data. The insertion of this "0" data corresponds to the depuncture processing.

The data $Z_1$ is supplied to the $C_1$ input of the Viterbi decoder 20 at the same timing as shown in FIG. 13G, the data $Z_2$ is delayed by one clock period and supplied to the $C_2$ input of the Viterbi decoder 20 as shown in FIG. 13H and supplied to data of the timing for Viterbi-decoding the punctured data, thereby making it possible to correctly decode the data thus decimated by the puncture processing.

Figure 14A:
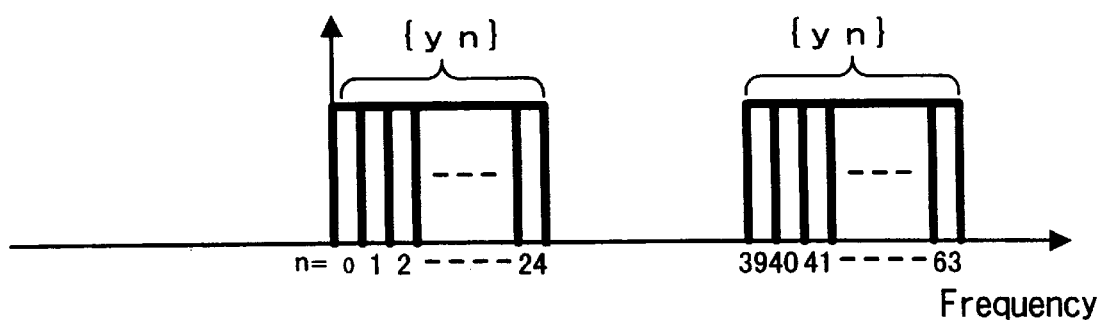
FIGS. 14A and 14B are frequency spectrum diagrams showing examples of frequency spectrums according to the first embodiment of the present invention.

When the transform processing is executed as described above, an OFDM-modulated signal having a frequency spectrum shown in FIG. 14A is orthogonal-transformed and then demodulated. That is, inputted data $\{X_k\}$ to the fast Fourier transform circuit 14 are data of n=0 to 24 and data of n=39 to 63 arranged on the frequency axis at a constant interval. The data arranged on this frequency axis become orthogonal-transformed data $\{Y_n\}$ outputted from the fast Fourier Transform circuit 13, and become deinterleaved data by the selection processing at the selectors 15r, 15i of the points of the data $\{Y_n\}$. Upon Viterbi decoding, the data are depunctured, and the data thus Viterbi-decoded is developed at the output terminal 21. The transform processing executed at the fast Fourier transform circuit 13 is expressed by the following equation (1):

$$y_n = \sum_{K=0}^{63} X_k e^{j\frac{2\pi kn}{64}} \quad (1)$$

Figure 14B:
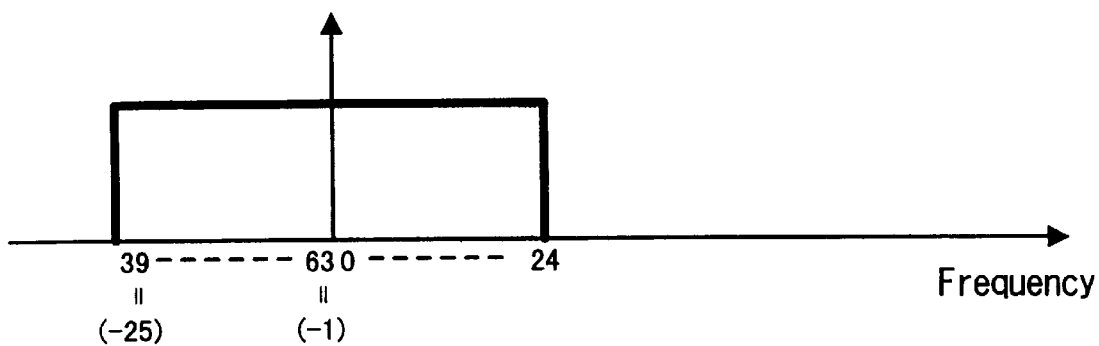

Although data are divided into two groups in the frequency spectrum shown in FIG. 14A, this frequency spectrum is equivalent to one continuous spectrum in which k=0 is the center as shown in FIG. 14B. When data is represented by the continuous frequency spectrum as shown in FIG. 14B, the transform equation in the fast Fourier transform circuit 13 is expressed by the following equation (2):

$$y_n = \sum_{k=-25}^{24} X_k e^{j\frac{2\pi kn}{64}} \quad (2)$$

According to the arrangement for processing data as described above, when the interleaved PFDM-modulated signal is received and orthogonal-transformed, by selecting only the transformed output from the fast Fourier transform circuit 13 with the selectors 15r, 15ii there can be executed the deinterleave processing for rearranging the interleaved data. Accordingly, by a simple arrangement which does not require the deinterleave processing memory and the deinterleave interconnection change processing unlike the prior art, the OFDM-modulated signal can be deinterleaved and the arrangement for demodulating the interleaved OFDM-modulated signal can be simplified. As compared with the deinterleave interconnection change processing (see FIG. 7), for example, the P/S converters are not required, and the circuit scale from the input terminal 11 to the output terminal 21 can be reduced considerably. Hence, the area of the circuit board in which the circuits corresponding to this portion are assembled can be reduced to about ⅓ as compared with the case in which the deinterleave interconnection change processing is executed. As compared with the case in which data is deinterleaved by using a memory, the area of the circuit board can be reduced similarly. Also, with respect to a time required by the demodulation processing, since the selection processing at the selectors 15r, 15i is executed at the same time the data is outputted from the fast Fourier transform circuit 13, an extra time for such selection processing is not required and a processing time for a deinterleave processing can be prevented from being extended unlike the case in which the deinterleave processing is executed by using a memory or the like.

In the case of the arrangement according to this embodiment, when data is selected by the selector, 0 data is inserted into data at a predetermined period, whereby the depuncture processing can be executed at the same time the deinterleave processing is executed. Thus, when data is decoded by the Viterbi decoder 20 connected to the succeeding stage, it is possible to execute the depuncture processing for restoring data decimated by the puncture processing. Accordingly, since there is not required any special depuncture processing circuit, from this standpoint, it becomes possible to reduce the circuit scale much more than the prior art, and also a power consumption necessary for the depuncture processing can be reduced. As the clock rate used in the depuncture processing, it is sufficient to use only a clock rate of received data, and clocks of different clock rates need not be prepared. Thus, the arrangement of the clock generating circuit can be simplified more, and also a spurious disturbance caused when clocks of different clock rates are used in the depuncture processing can be avoided unlike the prior art.

Figure 15:
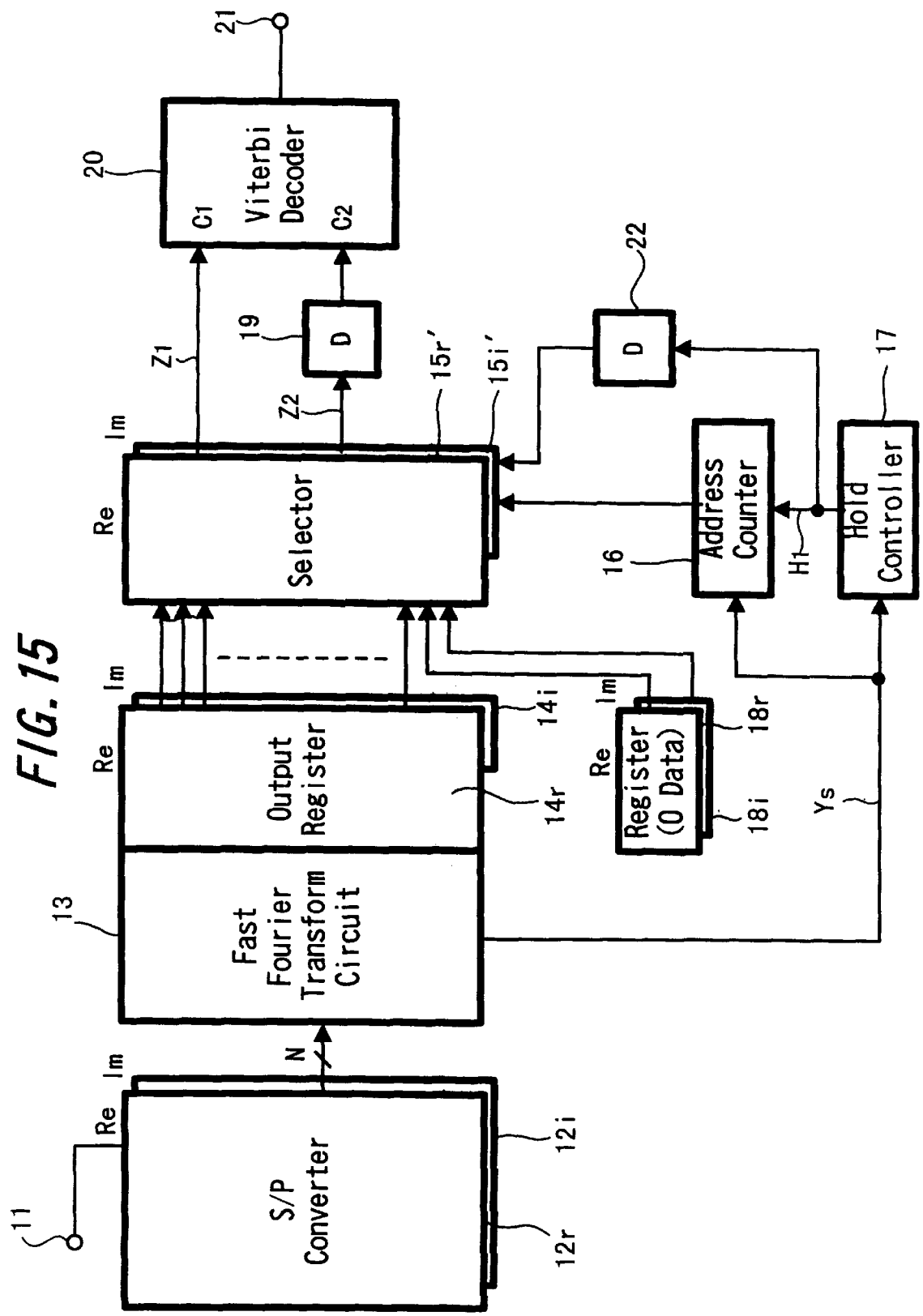
FIG. 15 is a block diagram showing a demodulation apparatus according to a second embodiment of the present invention.

A second embodiment of the present invention will be described with reference to FIG. 15. In FIG. 15, elements and parts identical to those of the first embodiment shown in FIG. 12 are marked with the same reference numerals and need not be described in detail.

Also in this embodiment, similarly to the above-mentioned first embodiment, the present invention is applied to the demodulation section within the reception apparatus for receiving the OFDM-modulated signal transmitted via radio waves. The received OFDM-modulated signal is interleaved and punctured. FIG. 15 is a block diagram showing an arrangement of a demodulation section according to this embodiment. As shown in FIG. 14, the OFDM-modulated signal, received in the form of the intermediate-frequency signal (or baseband signal) is supplied to the input terminal 11. The OFDM-modulated signal supplied to the input terminal 11 is supplied to the S/P converters 12r, 12i, in which it is converted into parallel data of predetermined bits.

The parallel data outputted from the S/P converters 12r, 12i is supplied to the fast Fourier transform circuit 13, in which a frequency axis is transformed into a time axis by the orthogonal transform processing according to the fast Fourier transform computation processing, thereby resulting in N points of M-bit data being generated. Then, M-bit data are set to N output registers 14r, 14i of the output section of the fast Fourier transform circuit 13 point by point.

Data of N points outputted from the fast Fourier transform circuit 13 are supplied to selectors 15r', 15i' simultaneously. The selectors 15r', 15i' sequentially select output points by data for designating the points outputted from the counter 16 serving as the output order data generating means. In addition to the outputs of the output registers 14r, 14i, 0 data (e.g. data in which 12 bits are all 0) previously-prepared in 0 data registers 18r, 18i are supplied to the selectors 15r', 15i'. By the output from the counter 16, the output points of the output registers 14r, 14i are selected in a predetermined sequential order. At the same time, at the timing in which there is supplied a pulse which results from delaying the hold pulse $H_1$ outputted from the hold controller 17 by one clock period by the delay circuit 22, 0 data supplied from the registers 18r, 18i are selected instead of the output data of the registers 14r, 14i. The order in which the output point is selected by the count address of the counter 16 is the order corresponding to the interleave pattern effected on the received OFDM-modulated signal. Also, the position at which 0 data is selected by the pulse from the hold controller 17 corresponds to the position at which data is decimated by the puncture processing effected on the received OFDM-modulated signal.

Then, the data $Z_1$ selected by the selector 15r' is inputted to the $C_1$ input of the Viterbi decoder 20, and the data $Z_2$ selected by the selector 15i' is delayed by one clock period and then supplied to the $C_2$ input of the Viterbi decoder 20. Then, the Viterbi decoder 20 Viterbi-decodes the signal based on the inputted data $C_1$, $C_2$ of two series, and the data thus Viterbi-decoded is developed at the output terminal 21.

The count of the address counter 16 is started by a start pulse Ys outputted from the fast Fourier transform circuit 13, and its count state is controlled by the hold controller 17. With respect to the hold controller 17, its processing timing is set by the start pulse Ys outputted from the fast Fourier transform circuit 13. The count state of the counter 16 is executed under control of the hold controller 17 in which the continuous count operation of two clock periods, for example, and the hold processing of the count value of one clock period are repeatedly carried out. When the hold pulse $H_1$ is supplied from the hold controller 17, the count value is held.

The remainder of the arrangement is made similar to that of the arrangement described in the above-mentioned first embodiment.

According to the arrangement of the second embodiment, a processing similar to that of the first embodiment can be carried out and similar effects can be achieved. That is, the data processing timing is exactly the same as that shown in FIGS. 13A to 13H of the first embodiment. While the 0 data is inserted by the selector after the state of the address data was judged in the first embodiment, according to this embodiment, such control is executed by data (delayed by one clock for matching a timing) directly supplied from the hold controller 17. Accordingly, based on the output pulse of the hold controller 17, the timing at which the 0 data is inserted by the selector can be judged simply, and the deinterleave processing and the depuncture processing can be carried out by a simple arrangement.

Figure 16:
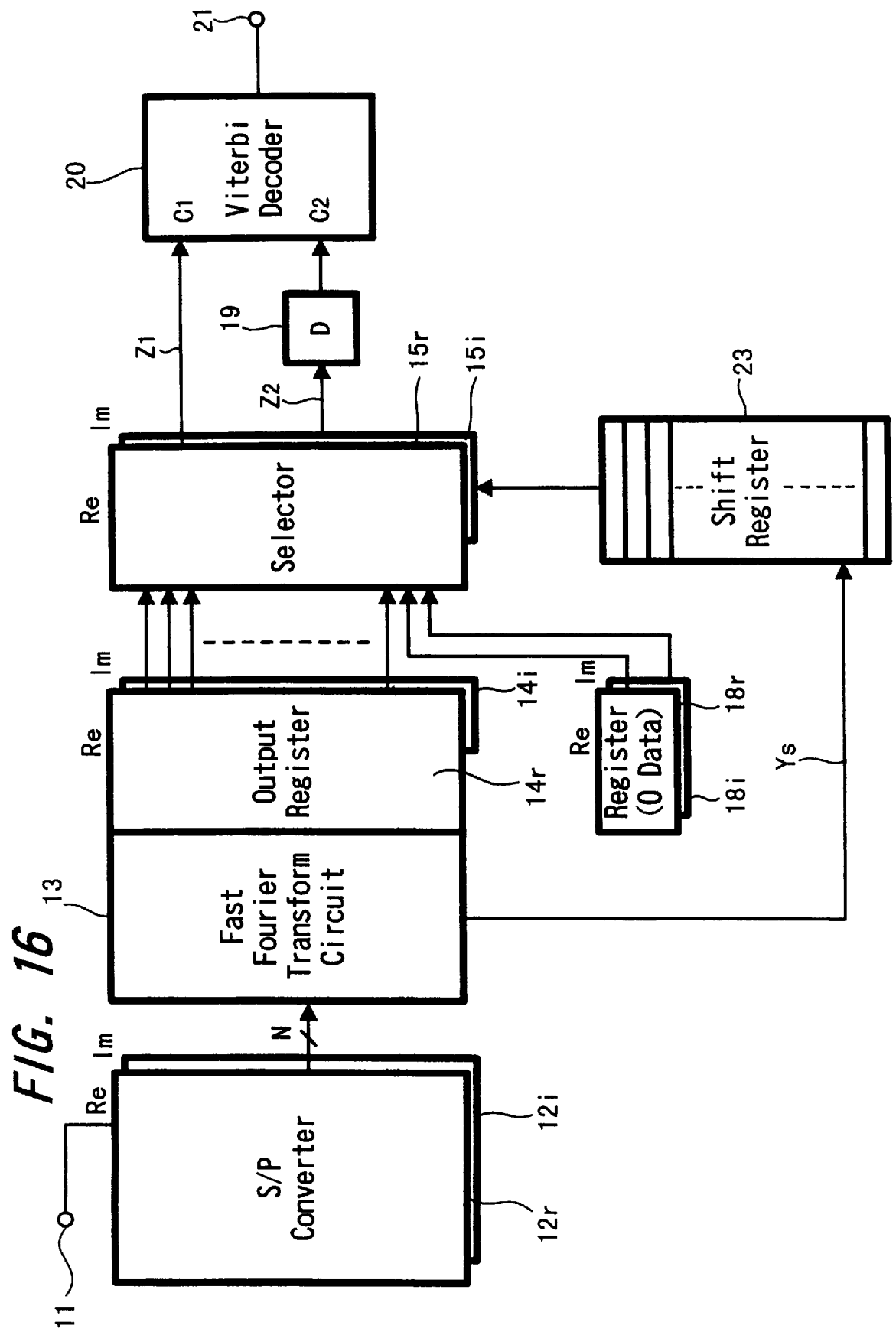
FIG. 16 is a block diagram showing a demodulation apparatus according to a third embodiment of the present invention.

A demodulation apparatus according to a third embodiment of the present invention will be described next with reference to FIG. 16. In FIG. 16, elements and parts corresponding to those of FIG. 12 in the first embodiment are marked with the same references and therefore need not be described in detail.

Also in this embodiment, similarly to the above-mentioned first and second embodiments, the present invention is applied to the demodulation section within the reception apparatus for receiving the OFDM-modulated signal transmitted via radio waves. The received OFDM-modulated signal is interleaved and punctured. FIG. 16 is a block diagram showing an arrangement of a demodulation section according to this embodiment. As shown in FIG. 16, the OFDM-modulated signal, received in the form of the intermediate-frequency signal (or baseband signal) is supplied to the input terminal 11. The OFDM-modulated signal supplied to the input terminal 11 is supplied to the S/P converters 12r, 12i, in which it is converted into parallel data of predetermined bits.

The parallel data outputted from the S/P converters 12r, 12i is supplied to the fast Fourier transform circuit 13, in which a frequency axis is transformed into a time axis by the orthogonal transform processing according to the fast Fourier transform computation processing, thereby resulting in N points of M-bit data being generated. Then, M-bit data are set to N output registers 14r, 14i of the output section of the fast Fourier transform circuit 13 point by point.

Data of N points outputted from the fast Fourier transform circuit 13 are supplied to selectors 15r, 15i simultaneously. The selectors 15r, 15i sequentially select output points by data for designating the points outputted from a shift register 23 serving as the output order data generating means. In addition to the outputs of the output registers 14r, 14i, 0 data (e.g. data in which 12 bits are all 0) previously-prepared in 0 data registers 18r, 18i are supplied to the selectors 15r, 15i. By the output from the shift register 23, the output points of the output registers 14r, 14i are selected in a predetermined sequential order. At the same time, when the data supplied from the shift register 23 is predetermined data, data supplied from the registers 18r, 18i are selected instead of the output data of the registers 14r, 14i. The order in which the output point is selected by the output of the shift register 23 is the order corresponding to the interleave pattern effected on the received OFDM-modulated signal. Also, the position at which 0 data is selected corresponds to the position at which data is decimated by the puncture processing effected on the received OFDM-modulated signal.

Then, the data $Z_1$ selected by the selector 15r is supplied to the $C_1$ input of the Viterbi decoder 20 and the data $Z_2$ selected by the selector 15$i$ is delayed by one clock period by the delay circuit 19 and then supplied to the $C_2$ input of the Viterbi decoder 20. Then, the Viterbi decoder 20 Viterbi-decoded data based on the inputted data $C_1$, $C_2$ Of two series, and the Viterbi-decoded data is developed at the output terminal 21.

Also, the address data is previously set in the shift register 23 in a predetermined order, and the output timing of the address data is reset by the start pulse Ys outputted from the fast Fourier transform circuit 13.

The remainder of the arrangement is similar to that of the above-mentioned first embodiment.

According to the arrangement of the third embodiment, a processing similar to that of the first embodiment can be carried out, and similar effects can be achieved. That is, the data processing timing is exactly the same as that shown in FIGS. 13A to 13H of the first embodiment. Accordingly, in the case of this embodiment, based on the data previously-prepared in the shift register 23, the deinterleave processing by the selector and the 0 data insertion processing for the depuncture processing can be carried out. Thus, the deinterleave processing and the depuncture processing can be carried out by the simple arrangement and the processing using the shift register as the output order data generating means.

A fourth embodiment according to the present invention will hereinafter be described with reference to FIG. 17 and FIGS. 18A to 18K. In FIG. 17 and FIGS. 18A to 18K, elements and parts corresponding to those of FIG. 10 and FIGS. 13A to 13H in the first embodiment are marked with the same references and therefore need not be described in detail.

Figure 17:
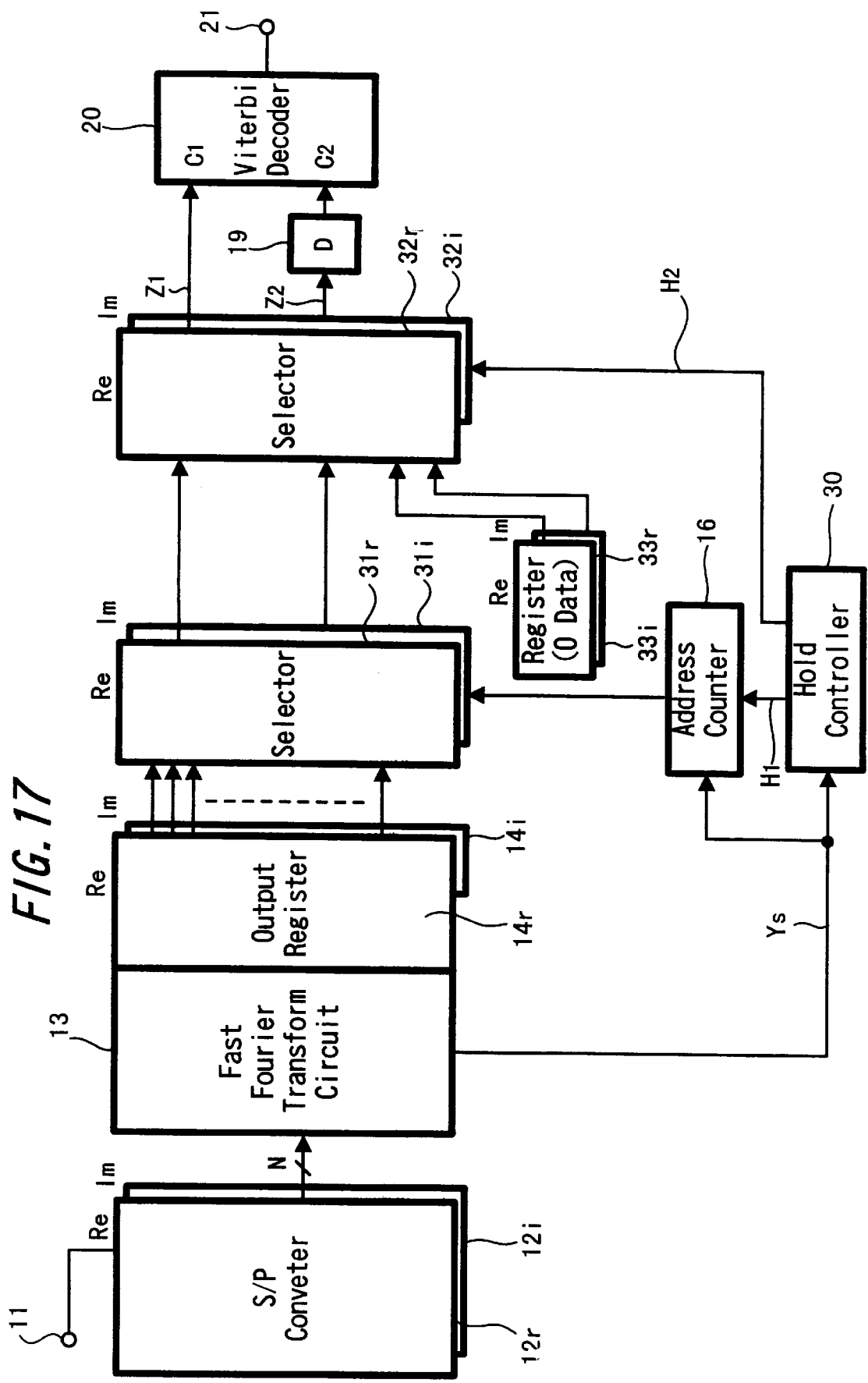
FIG. 17 is a block diagram showing a demodulation apparatus according to a fourth embodiment of the present invention.

Also in this embodiment, similarly to the above-mentioned first, second and third embodiments, the present invention is applied to the demodulation section within the reception apparatus for receiving the OFDM-modulated signal transmitted via radio waves. The received OFDM-modulated signal is interleaved and punctured. FIG. 17 is a block diagram showing an arrangement of a demodulation section according to this embodiment. As shown in FIG. 17, the OFDM-modulated signal, received in the form of the intermediate-frequency signal (or baseband signal) is supplied to the input terminal 11. The OFDM-modulated signal supplied to the input terminal 11 is supplied to the S/P converters 12$r$, 12$i$, in which it is converted into parallel data of predetermined bits.

The parallel data outputted from the S/P converters 12$r$, 12$i$ is supplied to the fast Fourier transform circuit 13, in which a frequency axis is transformed into a time axis by the orthogonal transform processing according to the fast Fourier transform computation processing, thereby resulting in N points of M-bit data being generated. Then, M-bit data are set to N output registers 14$r$, 14$i$ of the output section of the fast Fourier transform circuit 13 point by point.

Data of N points outputted from the fast Fourier transform circuit 13 are supplied to selectors 31$r$, 31$i$ simultaneously. The selectors 31$r$, 31$i$ sequentially select output points by data for designating the points outputted from the address counter 16 serving as the output order data generating means. The order in which the output points are selected by the output from the address counter is the order corresponding to the interleave pattern effected on the received OFDM-modulated signal.

Then, data of two series selected by the selectors 31$r$, 31$i$ are supplied to selectors 32$r$, 32$i$ simultaneously. In addition to the outputs of the selectors 31$r$, 31$i$, 0 data (e.g. data in which 12 bits are all 0) previously-prepared in 0 data registers 33$r$, 33$i$ are supplied to the selectors 32$r$, 32$i$. By the control of the select control pulse $H_2$ supplied from the hold controller 30, the output data from the selectors 31$r$, 31I and the 0 data are selected. Also, the position at which 0 data is selected corresponds to the position at which data is decimated by the puncture processing effected on the received OFDM-modulated signal.

Then, the data $Z_1$ selected by the selector 32$r$ is supplied to the $C_1$ input of the Viterbi decoder 20 and the data $Z_2$ selected by the selector 32$i$ is delayed by one clock period by the delay circuit 19 and then supplied to the $C_2$ input of the Viterbi decoder 20. Then, the Viterbi decoder 20 Viterbi-decoded data based on the inputted data $C_1$, $C_2$ of two series, and the Viterbi-decoded data is developed at the output terminal 21.

Incidentally, the start pulse Ys outputted from the fast Fourier transform circuit 13 is supplied to the address counter 16 and the hold controller 30, and its processing timing is reset by that start pulse Ys.

The remainder of the arrangement is similar to that of the above-mentioned first embodiment.

FIGS. 18A to 18K are timing charts showing the demodulation processing state according to the circuit of this embodiment. The processing state thereof will be described below. Initially, a clock signal (see FIG. 18A) synchronized with the received data supplied to the input terminal 11 is supplied to each circuit, and each circuit executes the processing in synchronism with this clock signal. When a transform output of one unit is outputted to the fast Fourier transform circuit 13, there is outputted a start pulse Ys shown in FIG. 18B, and a count address of the counter 16 shown in FIG. 18D is reset based on this start pulse Ys. At the same time, the hold control pulse $H_1$ of the hold controller 17 shown in FIG. 18C and a select control pulse $H_2$ shown in FIG. 18G are reset.

Here, the hold control pulse $H_1$ is the pulse for holding data once per three periods of the clock signal. In the address counted by the counter 16, the same address value is repeated once per three periods. This address order corresponds to the deinterleave processing order.

Based on the address data thus generated, the data $Z_1$ selected by the selector 31$r$ and the data $Z_2$ selected by the selector 31$i$ are outputted as shown in FIGS. 18E and 18F. The selectors 31$r$, 31$i$ repeatedly select the same data at the timing in which the same address value is repeated.

Then, the data selected by the selectors 31$r$, 31$i$ are supplied to the selectors 32$r$, 32$i$ and thereby generated as data delayed by one clock timing as shown in FIGS. 18H and 18I. By the select control pulse $H_2$ shown in FIG. 18G, data obtained at the position in which the same data is repeated is replaced with "0" data. The replacing processing for this "0" data corresponds to the depuncture processing.

The data $Z_1$ is supplied to the $C_1$ input at the same timing as shown in FIG. 18J, and data $Z_2$ is delayed by one clock and supplied to the $C_2$ input as shown in FIG. 18K, and then supplied to data indicating the timing for Viterbi-decoding the punctured data. Thus, the data decimated by the puncture processing can be decoded correctly.

According to the arrangement and the processing of this fourth embodiment, a processing similar to that of the first embodiment is carried out, and similar effects can be achieved. That is, while data are selected by a set of selectors 15$r$, 15$i$ for the deinterleave processing and the 0 data is inserted for the depuncture processing as described above, according to this embodiment, the selection processing for the deinterleave processing is executed by the first set of the selectors 31r, 31i and the selection processing for the depuncture processing is executed by the second set of the selectors 32r, 32i, and in this point of the section processing of the two stages, this embodiment differs from the above-mentioned embodiments. Since the selection processing is divided by the selector as described above, the burden imposed upon the respective selectors can be decreased, and the processing of the present invention can be realized by a combination of the selectors of the simple arrangement.

In the case of the fourth embodiment, while the selection for the deinterleave processing is executed by the output of the address counter, the present invention is not limited thereto and the selection may be realized based on the output of the data previously-prepared in the shift register as described in the third embodiment. While the hold control pulse $H_1$ and the select control pulse $H_2$ are generated respectively in the arrangement of FIG. 17, the present invention is not limited thereto, and the select control pulse $H_2$ may be generated by delaying the hold control pulse $H_1$ by two clock periods.

According to the demodulation method described above, the interleaved data is deinterleaved by the sequential order in which output points are selected and 0 data is inserted into the predetermined position of the selected data, whereby the data processing necessary for the depuncture processing is executed. Then, by decoding the data into which the 0 data is inserted, the data decimated by the puncture processing upon modulation can be restored. Thus, the demodulation processing of the OFDM-modulated signal, the deinterleave processing and the depuncture processing can be satisfactorily executed by a simple processing and in a short period of time.

According to the demodulation method described above the output order data is sequentially generated by a count processing, and the count processing is temporarily stopped and the position of the 0 data is controlled by predetermined control data. Thus, by the count processing and the simple processing based on the control of its count processing, the deinterleave processing and the depuncture processing can be carried out properly.

According to the demodulation method described above the control data for temporarily stopping the count processing is delayed by a predetermined period and thereby generated as control data for selecting the 0 data. Thus, by the delay processing, the control of the count processing and the control of the 0 data selection processing using one control data become possible, and hence the control processing can be simplified.

According to the demodulation method described above the output order data sequentially outputs previously-prepare data. Thus, the proper selection processing can be executed by the simple processing in which the prepared data is output.

According to the demodulation method described above, the selection processing comprises a first selection processing for selecting output points from the Fourier-transformed data of N points and a second processing for selecting a position at which 0 data is inserted into output data selected by the first selection processing. Thus, the deinterleave processing and the depuncture processing can be satisfactorily carried out by a combination of two selection processings.

According to the demodulation apparatus described above, the interleaved data is deinterleaved by the sequential order in which output points are selected and 0 data is inserted into the predetermined position of the selected data, whereby the data processing necessary for the depuncture processing is executed. Then, by decoding the data into which the 0 data is inserted, the data decimated by the puncture processing upon modulation can be restored. Thus, the demodulation processing of the OFDM-modulated signal, the deinterleave processing and the depuncture processing can be satisfactorily executed by a simple processing and in a short period of time.

According to the demodulation apparatus described above, the output order data generating means comprises a counter for sequentially generating data corresponding to the output order by a count processing and control means for temporarily stopping the count processing of the counter at every predetermined period and controlling the selecting means such that the selecting means selects 0 data at every predetermined period. Thus, a proper processing can be carried out by a combination of the counter and the counter control means.

According to the demodulation apparatus described above, the control signal for temporarily stopping the count processing outputted from the control means is delayed by a predetermined period and thereby generated as a control signal for controlling the selecting means such that the selecting means selects 0 data. Thus, by the simple arrangement using only the delay means, the respective controls can be satisfactorily processed by one control signal, and the arrangement can be made simpler.

According to the demodulation apparatus described above, since the output order data generating means comprises a shift register for sequentially outputting previously-prepared data, a proper processing can be carried out by the simple arrangement using the shift register.

According to the demodulation apparatus described above, since the selecting means comprises first selection means for selecting output points from the data of N points outputted from the Fourier-transform means and second selection means for selecting a position at which 0 data is inserted into an output of the first selection means, the deinterleave and the depuncture can be satisfactorily executed by the processing using the two selection means.

Having described preferred embodiments of the invention with reference to the accompanying drawings, it is to be understood that the invention is not limited to those precise embodiments and that various changes and modifications could be effected therein by one skilled in the art without departing from the spirit or scope of the invention as defined in the appended claims.

What is claimed is:

1. A demodulation method comprising the steps of:
   transforming data distributed on a frequency axis at a predetermined frequency interval into data of N points (N is an arbitrary integer) at every predetermined unit;
   selecting data designated based on predetermined output order data from said transformed data of N points and previously-prepared 0 data; and
   effecting a decoding processing based on data obtained from said selecting step.

2. A demodulation method as claimed in claim 1, wherein said output order data is sequentially generated by a count processing, and said count processing is temporarily stopped and a position of said 0 data is controlled by predetermined control data.

3. A demodulation method as claimed in claim 2, wherein said control data for temporarily stopping said count processing is delayed by a predetermined period and thereby generated as control data for selecting said 0 data.

4. A demodulation method as claimed in claim 1, wherein said output order data sequentially outputs previously prepared data.

5. A demodulation method as claimed in claim 1, wherein said selecting step comprises a first selection processing for selecting output points from said transformed data of N points and a second processing for selecting a position at which 0 data is inserted into output data selected by said first selection processing.

6. A demodulation apparatus comprising:
   Fourier-transform means for transforming data distributed on a frequency axis at a predetermined frequency interval into data of N points (N is an arbitrary integer) at every predetermined unit;
   means for selecting designated data from said transformed data of N points outputted from said Fourier-transform means and previously-prepared 0 data and outputting said selected data as data of a plurality of series;
   means for designating selected data for said selecting means based on an output order data; and
   decoding data based on data of said plurality of series outputted from said selecting means.

7. A demodulation apparatus as claimed in claim 6, wherein said means for designating selected data comprises a counter for sequentially generating data corresponding to the output order data by a count processing, and control means for temporarily stopping the count processing of said counter at every predetermined period and controlling said selecting means such that said selecting means selects 0 data at every predetermined period.

8. A demodulation apparatus as claimed in claim 7, wherein a control signal for temporarily stopping the count processing which is outputted from said control means is delayed by a predetermined period and thereby generated as a control signal for controlling said selecting means such that said selecting means selects 0 data.

9. A demodulation apparatus as claimed in claim 6, wherein said means for designating selected data comprises a shift register for sequentially outputting previously-prepared data.

10. A demodulation apparatus as claimed in claim 6, wherein said selecting means comprises first selection means for selecting output points from said data of N points outputted from said Fourier-transform means and second selection means for selecting a position at which 0 data is inserted into an output of said first selection means.

* * * * *